(12) United States Patent
Gorokhov et al.

(10) Patent No.: US 8,159,928 B2
(45) Date of Patent: Apr. 17, 2012

(54) SIGNAL TRANSMISSION IN A WIRELESS COMMUNICATION SYSTEM

(75) Inventors: Alexei Gorokhov, San Diego, CA (US); Aamod Khandekar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 11/864,644

(22) Filed: Sep. 28, 2007

(65) Prior Publication Data

US 2008/0095036 A1   Apr. 24, 2008

Related U.S. Application Data

(60) Provisional application No. 60/849,293, filed on Oct. 3, 2006, provisional application No. 60/883,755, filed on Jan. 5, 2007.

(51) Int. Cl.
  *H04J 11/00* (2006.01)
(52) U.S. Cl. ............ 370/203; 455/436; 455/450
(58) Field of Classification Search ........ 370/331; 455/436, 450; 375/132, 308
  See application file for complete search history.

(56) References Cited

U.S. PATENT DOCUMENTS

| | | | | |
|---|---|---|---|---|
| 7,035,340 B2 * | 4/2006 | Noda | ............ | 375/261 |
| 7,420,939 B2 | 9/2008 | Laroia et al. | | |
| 7,627,048 B2 | 12/2009 | Larsson | | |
| 2001/0053695 A1 * | 12/2001 | Wallentin | ............ | 455/436 |
| 2003/0063688 A1 * | 4/2003 | Noda | ............ | 375/308 |
| 2005/0096061 A1 * | 5/2005 | Ji et al. | ............ | 455/450 |
| 2005/0099968 A1 | 5/2005 | Yamano | | |
| 2007/0280170 A1 * | 12/2007 | Kawasaki | ............ | 370/331 |

FOREIGN PATENT DOCUMENTS

| WO | 0031893 | 6/2000 |
|---|---|---|
| WO | 2007149997 | 12/2007 |
| WO | WO2007149961 | 12/2007 |

OTHER PUBLICATIONS

Tomick, Jim: "MBFDD and MBTDD Wideband Mode: Technology Overview" IEEE C802.20-05/68r1, Jan. 2006, pp. 1-109, Internet Citation, [Online] Oct. 28, 2005, XP002422172, URL::http://www.ieee802.org/20/Contributions.html> [retrieved on Feb. 6, 2007].
International Search Report—PCT/US2007/080110, International Search Authority—European Patent Office—May 8, 2008.
Written Opinion—PCT/US2007/080110, International Search Authority—European Patent Office—May 8, 2008.
Taiwan Search Report—TW096137097—TIPO—May 25, 2011.

(Continued)

*Primary Examiner* — Albert T Chou
(74) *Attorney, Agent, or Firm* — Charles E. Eggers

(57) ABSTRACT

Interference management is provided through use of a user-based interference control and/or a network-based interference control. For user-based interference control, the terminals are informed of the inter-sector interference observed by the neighbor sectors and can adjust their transmit powers accordingly so that the inter-sector interference is maintained within acceptable levels. For network-based interference control, each sector is informed of the inter-sector interference observed by the neighbor sectors and regulates data transmissions for its terminals such that the inter-sector interference is maintained within acceptable levels. Each system may utilize only user-based interference control, or only network-based interference control, or both.

42 Claims, 11 Drawing Sheets

OTHER PUBLICATIONS

Tomcik Jim: "MBFDD and MBTDD Wideband Mode: Technology overwiev", Jan. 6, 2006; Retrieved from the Internet; URL:http://www.ieee802.org/20/Contributions.html> (retrieved on Feb. 23, 2010) 1. Introduction, 6.1.1 Forward Physical channels, 6.3 Frame structure; 8.2 channel coding; 10. Acquisition; 15.3 Reverse Link Traffic Channel Power Control.

Jim Tomcik, MBTDD Updates,IEEE C802.20-06-07, Jan. 6, 2006, pp. 1,19,URL,http://www.ieee802.org/20/Contribs/C802.20-06-07.pdf.

* cited by examiner

SIGNAL TRANSMISSION IN A WIRELESS COMMUNICATION SYSTEM

CROSS-REFERENCE

This application claims the benefit of U.S. Provisional Application Ser. No. 60/849,293, filed Oct. 3, 2006, entitled "SIGNAL TRANSMISSION IN A WIRELESS COMMUNICATION SYSTEM", and U.S. Provisional Application Ser. No. 60/883,755, filed Jan. 5, 2007, entitled "SIGNAL TRANSMISSION IN A WIRELESS COMMUNICATION SYSTEM". The entirety of these applications are incorporated herein by reference.

BACKGROUND

I. Field

The following description relates generally to wireless communication systems, and amongst other things to signal transmission in a wireless communication system.

II. Background

A wireless multiple-access communication system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the transmissions on each link to be orthogonal to one another in time, frequency and/or code domain.

On the reverse link, the transmissions from terminals communicating with different base stations are typically not orthogonal to one another. Consequently, each terminal may cause interference to other terminals communicating with nearby base stations and may also receive interference from these other terminals. The performance of each terminal is degraded by the interference from the other terminals communicating with other base stations.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with mitigating interference in a wireless communication system. An aspect relates to a method for transmitting information in a wireless communication system. The method includes generating a first portion of a signal corresponding to a sector-specific sequence in a first OFDM symbol. The method also includes generating a second portion of the signal corresponding to the sector-specific sequence multiplied with a value for the signal in a second OFDM symbol.

In accordance with another aspect is a wireless communications apparatus that includes a processor and a memory. The processor executes instructions for generating a signal for transmission, the signal includes a first portion that corresponds to a sector-specific sequence in a first OFDM symbol and a second portion corresponds to the sector-specific sequence multiplied with a value for the signal in a second OFDM symbol. The memory stores information relating to the instructions generated by processor.

Another aspect relates to a wireless communications apparatus that provides interference information. The apparatus includes a means for creating a first portion of a signal corresponding to a sector-specific sequence in a first OFDM symbol. Also included is a means for creating a second portion of the signal corresponding to the sector-specific sequence multiplied with a value for the signal in a second OFDM symbol.

Still another aspect relates to a machine-readable medium having stored thereon machine-executable instructions for generating a first portion of a signal corresponding to a sector-specific sequence in a first OFDM symbol. The machine-executable instructions also include generating a second portion of the signal corresponding to the sector-specific sequence multiplied with a value for the signal in a second OFDM symbol. The signal can include an interference report and the value comprises an interference value.

Yet another aspect is an apparatus operable in a wireless communication system. The apparatus includes a processor configured to generate a first portion of a signal corresponding to a sector-specific sequence in a first OFDM symbol. The processor can also be configured to generate a second portion of the signal corresponding to the sector-specific sequence multiplied with a value for the signal in a second OFDM symbol. The signal can include an interference report and the value can comprise an interference value.

In a related aspect is a method for processing information in a wireless communication system. The method includes receiving a signal that includes a first portion and a second portion and using the first portion and the second portion to obtain an Other Sector Interference (OSI) value. Additionally, method can include modifying a transmit power level based on the OSI value. The OSI value can indicate one of an excessive interference, a high interference, or a minimal interference.

According to another aspect is a wireless communications apparatus that includes a processor and a memory that stores information relating to the instructions generated by the processor. The processor can execute instructions for receiving a signal that includes a first portion and a second portion and using the first portion and the second portion to obtain an OSI value.

Yet another aspect relates to a wireless communications apparatus that processes information. The apparatus can include a means for receiving a signal that includes a first portion and a second portion. Also included is a means for using the first portion and the second portion to obtain an Other Sector Interference (OSI) value.

Another aspect relates to a machine-readable medium having stored thereon machine-executable instructions for receiving a signal that includes a first portion and a second portion. The first portion and the second portion can be used to obtain an Other Sector Interference (OSI) value that indicates of an excessive interference, a high interference, or a minimal interference. The instructions also modify a transmit power level based on the OSI value.

In another aspect is an apparatus operable in a wireless communication system that includes a processor. The processor can be configured to receive a signal that includes a first portion and a second portion and utilize the first portion and the second portion to obtain an Other Sector Interference (OSI) value. The OSI value can indicate one of an excessive interference, a high interference, or a minimal interference.

The processor can also be configured to modify a transmit power level based on the OSI value.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
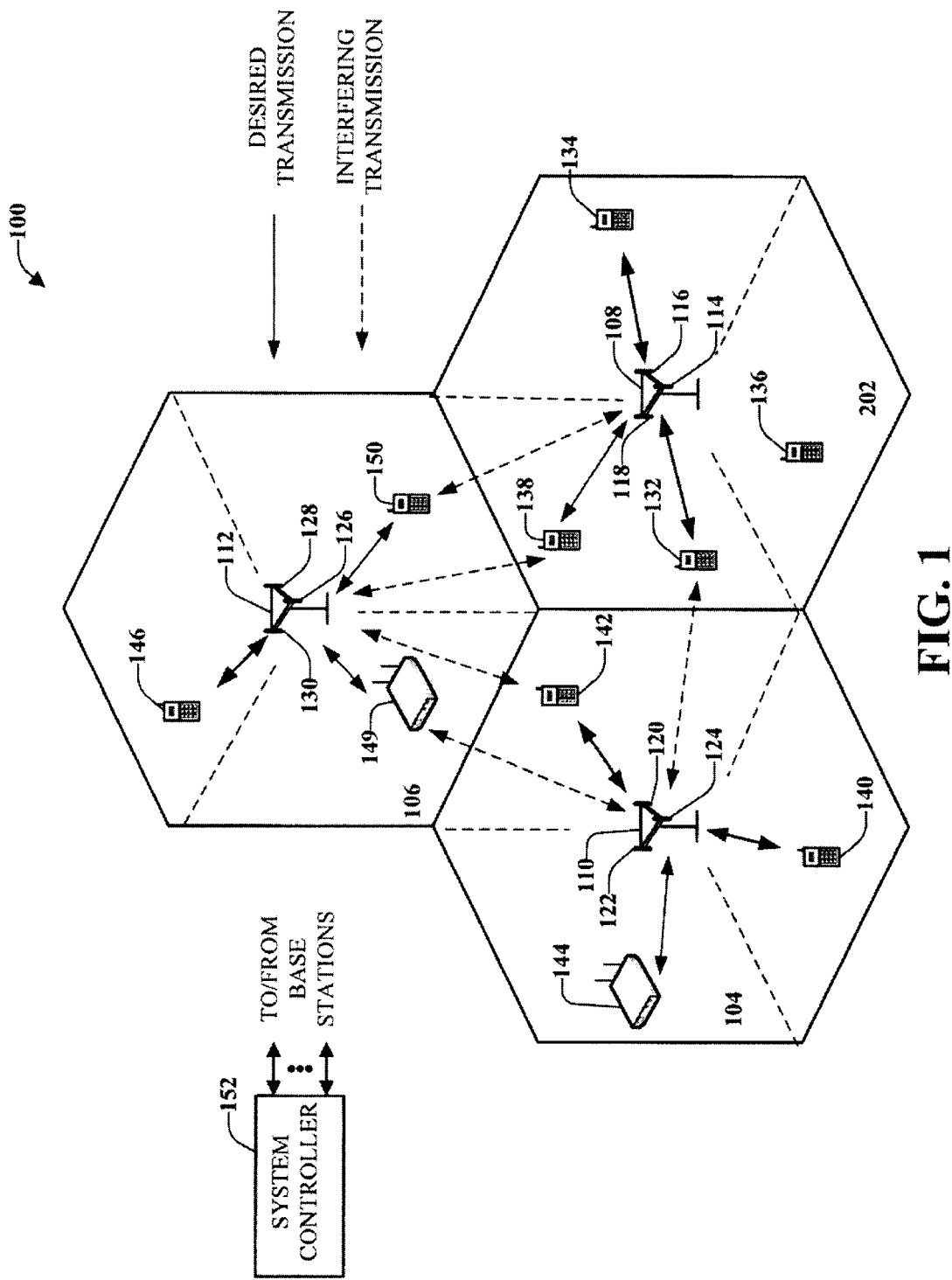
FIG. 1 illustrates a multiple access wireless communication system according to various embodiments for signal transmission.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

FIG. 1 illustrates a multiple access wireless communication system 100 according to various embodiments for signal transmission. System 100 can facilitate mitigating interference. In further detail, a multiple access wireless communication system 100 includes multiple cells, e.g. cells 102, 104, and 106. In the embodiment of FIG. 1, each cell 102, 104, and 106 may include an access point 108, 110, 112 that includes multiple sectors. The multiple sectors are formed by groups of antennas each responsible for communication with access terminals in a portion of the cell. In cell 102, antenna groups 114, 116, and 118 each correspond to a different sector. In cell 104, antenna groups 120, 122, and 124 each correspond to a different sector. In cell 106, antenna groups 126, 128 and 130 each correspond to a different sector.

Each cell includes several access terminals, which are in communication with one or more sectors of each access point. For example, access terminals 132, 134, 136, and 138 are in communication with base station 108, access terminals 140, 142, and 144 are in communication with access point 110, and access terminals 146, 148, and 150 are in communication with access point 112.

As illustrated in cell 104, for example, each access terminal 140, 142, and 144 is located in a different portion of it respective cell than each other access terminal in the same cell. Further, each access terminal 140, 142, and 144 may be a different distance from the corresponding antenna groups with which it is communicating. Both of these factors provide situations, also due to environmental and other conditions in the cell, to cause different channel conditions to be present between each access terminal and its corresponding antenna group with which it is communicating.

In accordance with some aspects, access terminals in a particular cell may be in communication with the access point associated with that cell and at substantially the same time be in communication with an access point associated with a different cell. For example, access terminal 132 may be in communication with access point 108 and 110; access terminal 148 may be in communication with access points 110 and 112; and access terminal 150 may be in communication with access points 108 and 112.

A controller 152 is coupled to each of the cells 102, 104, and 106. Controller 152 may contain one or more connections to multiple networks, such as the Internet, other packet based networks, or circuit switched voice networks that provide information to, and from, the access terminals in communication with the cells of the multiple access wireless communication system 100. Controller 152 includes, or is coupled with a scheduler that schedules transmission from and to access terminals. In some embodiments, scheduler may reside in each individual cell, each sector of a cell, or a combination thereof.

The interference control techniques described herein may be used for a system with sectorized cells and a system with un-sectorized cells. In the following description, the term "sector" refers to a conventional BTS and/or its coverage area for a system with sectorized cells and/or a conventional base station and/or its coverage area for a system with un-sectorized cells. The terms "terminal" and "user" are used interchangeably, and the terms "sector" and "base station" are also used interchangeably. A serving base station/sector is a base station/sector with which a terminal communicates. A neighbor base station/sector is a base station/sector with which the terminal is not in communication.

The interference control techniques may also be used for various multiple-access communication systems. For example, these techniques may be used for a code division multiple access (CDMA) system, a frequency division multiple access (FDMA) system, a time division multiple access (TDMA) system, an orthogonal frequency division multiple access (OFDMA) system, an interleaved (IFDMA) system, a localized FDMA (LFDMA) system, a spatial division multiple access (SDMA) system, a quasi-orthogonal multiple-access system, and so on. IFDMA is also called distributed FDMA, and LFDMA is also called narrowband FDMA or classical FDMA. An OFDMA system utilizes orthogonal frequency division multiplexing (OFDM). OFDM, IFDMA, and LFDMA effectively partition the overall system bandwidth into multiple (K) orthogonal frequency subbands. These subbands may also be called tones, subcarriers, bins, and so on. OFDM transmits modulation symbols in the frequency domain on all or a subset of the K subbands. IFDMA transmits modulation symbols in the time domain on subbands that are uniformly distributed across the K subbands. LFDMA transmits modulation symbols in the time domain and typically on adjacent subbands.

As shown in FIG. 1 each sector may receive "desired" transmissions from terminals within the sector as well as "interfering" transmissions from terminals in other sectors. The total interference observed at each sector is composed of (1) intra-sector interference from terminals within the same sector and (2) inter-sector interference from terminals in other sectors. It should be noted that in an orthogonal system, such as OFDMA, IFDMA, or LFDMA, there is minimal, if any, intra-sector interference. Therefore, in such orthogonal systems, inter-sector interference is a dominant concern. The inter-sector interference, which is also called other sector interference (OSI), results from the transmissions in each sector not being orthogonal to the transmissions in the other sectors. The inter-sector interference and any intra-sector interference have an impact on performance and may be mitigated as described below.

Inter-sector interference may be controlled using various mechanisms such as user-based interference control and network-based interference control. For user-based interference control, the terminals are informed of the inter-sector interference observed by the neighbor sectors and adjust their transmit powers accordingly so that the inter-sector interference is maintained within acceptable levels. For network-based interference control, each sector is informed of the inter-sector interference observed by the neighbor sectors and regulates data transmissions for its terminals such that the inter-sector interference is maintained within acceptable levels. The system may utilize only user-based interference control, or only network-based interference control, or both user-based interference control and network-based interference control. The interference control mechanisms, and their combinations, may be implemented in various manners, as described below.

Figure 2:
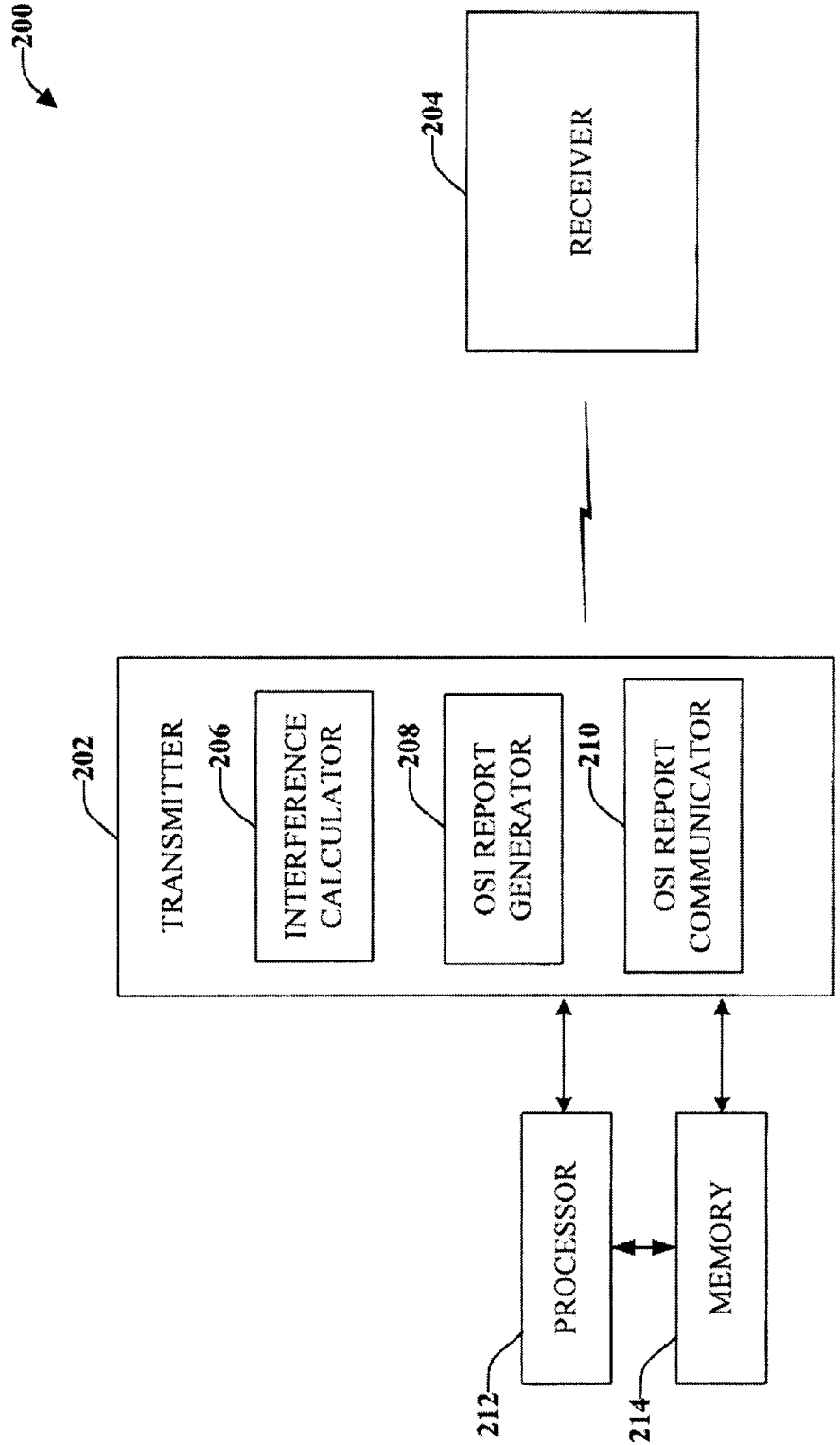
FIG. 2 illustrates an example system that facilitates transmitting information in a wireless communication system.

FIG. 2 illustrates and example system 200 that facilitates transmitting information in a wireless communication system. System 200 can be configured to serve and report interference measurements that can be utilized by receiving devices to modify respective transmissions.

In further detail, system 200 includes a transmitter 202 that is in wireless communication with a receiver 204. Transmitter 202 can be a base station and receiver 204 can be a communication device, for example. It should be understood that system 200 could include one or more transmitters 202 and one or more receivers 204. However, only one receiver and only one transmitter are shown for purposes of simplicity.

Transmitter 202 includes an interference calculator 206 that can be configured to observe interference from receivers (e.g., terminals) 204. The receivers 204 can be receivers being served by a different transmitter or receivers in a different sector. Such receivers might be on the edge or outer boundary of a respective sector. Based in part on the observed interference, estimates of the interference can be established by interference calculator 206. In accordance with some aspects, the estimates are based on raw measurements or thresholds obtained by transmitter 202 for terminals contained in other sectors.

Based upon the estimate, an OSI report generator 208 can be configured to create an OSI (Other Sector Interference) report. This report can be utilized to convey the value of inter-sector interference (e.g., interference caused by receivers in neighboring sectors). Alternatively or additionally, the OSI report can contain various information including interference thresholds, interference measurements, path losses, received power from terminals of is own sector measured by other transmitters (e.g., sectors) and/or other information that can be utilized to determine interference caused by terminals in its sector and other sectors.

OSI report generator 208 can estimate the inter-sector interference in various manners. For a system utilizing orthogonal multiplexing, a receiver 204 may transmit data or a pilot on each subcarrier in each symbol period. OSI report generator 208 can estimate the interference on a given subcarrier k in a given symbol period n based on a pilot received from receiver 204. OSI report generator 208 can estimate the interference based on data received from receiver 204. In accordance with some aspects, OSI report generator 208 can perform joint channel and interference estimation to obtain both channel response estimates and interference estimates. Further information relating to these estimates with be provided below.

The OSI reports (or interference reports) can contain a value that represents an interference level, value, or other means of communicating an amount of interference. For example, a first value can indicate excessive interference; a second value can indicate a high interference; and a third value can indicate minimal interference. Based on the interference values included in a received OSI report, a receiver 204 can modify a transmit power to help mitigate interference.

In accordance with some aspects, the interference report is sent in a signal that has a first portion and a second portion. The first position can correspond to a sector-specific sequence and in a first OFDM symbol. The second portion can correspond to the sector-specific sequence multiplied with a value for the signal in a second OFDM symbol. The sector-specific sequence can be different for the first and second portions. Alternatively or additionally, both sequences may be multiplied by a complex number, which depends on the signal value. In accordance with some aspects, the first sector-specific sequence can include a sector-specific random sequence multiplied by a single complex value X and the second sequence can include a different sector-specific random sequence multiplied by another value Y. In some instances, there complex numbers have unit magnitude (e.g., the numbers may correspond to a phase shift). In this specification, the complex numbers might simply be referred to by their phase. Value Y can be the square of value X.

The phases multiplying the two sequences can be different. The phase can be chosen from a group consisting of 0, $2\pi/3$ and $4\pi/3$. Phases 0, $2\pi/3$ and $4\pi/3$ constitute 3-Phase Shift Keying (3PSK) signaling and provide the maximum distance between constellation points for a three-symbol equal-magnitude constellation. The square values form the same constellation. Thus, on a coherent channel (e.g., when a good channel estimate is available) the performance is similar to that of a repeated 3PSK constellation. However, if a channel estimate is not available, the phase difference between Y and X also belongs to a 3PSK constellation and, thus, this behaves as a differentially coded 3PSK system.

The OSI report can be sent to receivers 204 and/or to other transmitters (e.g., other sectors) by OSI report communicator 210. Based upon the information contained in the report(s) one or more receivers 204 might adjust a respective transmit power to reduce the amount of inter-sector interference observed by transmitter 202. OSI report communicator 210 can send the report(s) periodically or only if transmitter 202 observes excessive interference. The rate at which OSI reports are exchanged between transmitters 202 (e.g., sectors) can be the same or different from the rate at which the OSI reports are broadcast to the receivers 204.

System 200 can include a processor 212 operatively connected to transmitter 202 (and/or memory 214) to execute instructions relating to observing interference, estimating an interference level, creating one or more interference reports, receiving interference reports from neighboring sectors. In accordance with some aspects, processor can execute instructions for generating a signal for transmission including a first portion corresponding to a sector-specific sequence in a first OFDM symbol and a second portion corresponding to the sector-specific sequence multiplied with a value for the signal in a second OFDM symbol. Both sequences may be multiplied by a complex number, which depends on the signal value. Memory 214 can store information related to the instructions executed by processor 212 and other suitable information related to transmitting information in a wireless communication network.

Processor 212 can be a processor dedicated to analyzing and/or generating information received by transmitter 202 (e.g., interference levels, reports from other sectors, and so forth). Processor 212 can also be a processor that controls one or more components of system 200, and/or a processor that both analyzes and generates information received by transmitter 202 and controls one or more components of system 200.

Memory 214 can store protocols associated with interference level estimates, OSI reports generated, reports received from other sectors, taking action to control communication between transmitter 202 and receiver 204, etc., such that system 200 can employ stored protocols and/or algorithms to transmit information in a wireless network as described herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 214 of the disclosed embodiments are intended to comprise, without being limited to, these and other suitable types of memory.

Figure 3:
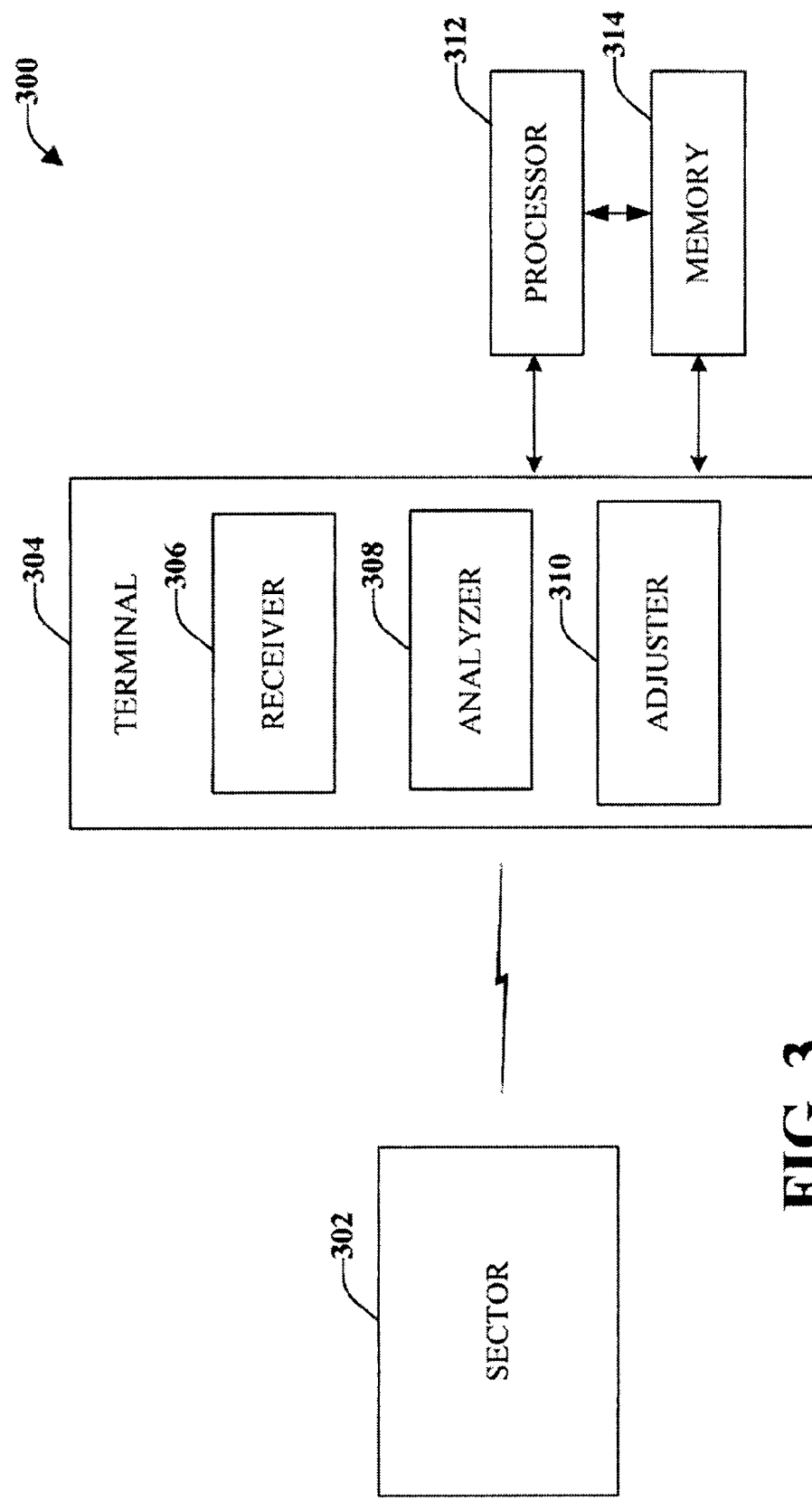
FIG. 3 illustrates an example system for receiving information and modifying a transmit power based in part on the received information.

With reference now to FIG. 3, illustrated is an example system 300 for receiving information and modifying a transmit power based in part on the received information. Modifying a transmit power can mitigate interference within a wireless communication system.

System 300 is similar to the system shown and described in the above figure and includes one or more sectors 302 in communication with one or more terminals 304. Each sector 302 can receive desired transmission from terminals being served by sector 302 as well as interfering transmissions from terminals in other sectors. The interference observed by each sector 302 can be a function of one or more of intra-sector interference (if any) from terminals in the same sector and/or inter-sector interference from terminals in other sectors. The inter-sector interference or OSI is a function of transmissions in each sector not being orthogonal to transmissions in other sectors.

Terminal 304 includes a receiver 306 that can be configured to receive an OSI report from a serving sector 302 as well as other sectors from which communications can be received by terminal 304. Thus, each sector 302 can estimate its respective interference and communicate the interference information to any terminal within a communication range. As such, terminal 304 should monitor the OSI from several sectors, including those sectors that might be somewhat remote from the terminal 304. Therefore, the OSI report signaling should be reliable and permit low complexity OSICH signal detection at terminal.

The OSI report can be received as a signal that includes a first portion and a second portion. The first position can correspond to a sector-specific sequence in a first OFDM symbol. The second portion can correspond to the sector-specific sequence multiplied with a value for the signal in a second OFDM symbol. Alternatively, both sequences can be multiplied by a complex number that depends on the signal value. In accordance with some aspects, the sector-specific sequence can be different for the first and second portions. The phases multiplying the two sequences can be different. The phase can be chosen from a group consisting of 0, $2\pi/3$ and $4\pi/3$. In accordance with some aspects, the first sector-specific sequence can include a sector-specific random sequence multiplied by a single complex value X and the second sequence can include a different sector-specific random sequence multiplied by another value Y. The value Y can be the square of value X.

An analyzer 308 can be configured to determine the amount of interference experienced by a neighboring sector 302. In accordance with some aspects, the determination includes performing a channel estimation using the first portion of the signal to derive a channel estimate and using the channel estimate to compute an interference value included in the second portion. In other aspects, the time-domain channel can be estimated using some other pilots that may be available. For example, in a UMB system, the Preamble Pilot Channel, also known as F-PPICH, may be used to estimate the channel. A few strong paths can be selected from this time-domain estimate and then the two-symbol OSICH transmissions can be demodulated in a coherent manner.

Another manner of determining the amount of interference experienced includes selecting a few strong paths using a channel estimate based on the two OFDM symbols and correlating the phase across the two OFDM symbols for each of those paths. The different correlation values can be added together to obtain an overall correlation value. The phase of this correlation value can be used to determine the OSI value.

The amount of interference, in accordance with one aspect, can be excessive interference, high interference, or minimal interference (e.g., excessive, high, and low). An example of an alternative classification means is a numbering scheme wherein "0" indicates minimal interference, "1" indicates high interference, and "2" indicates extremely high or excessive interference. However, it should be understood that other means of classifying interference can be utilized.

Based on the amount of interference experienced by a neighboring sector 302, an adjuster 310 can be configured to modify a transmit power, which can include reducing the transmit power, maintaining the same transmit power, or increasing the transmit power. For example, if analyzer 308 determines that the interference level is excessive, adjuster 310 can reduce the transmit power at a fast rate and/or with a larger down step size. If the interference level is determined to be high, adjuster 310 can reduce the transmit power with a nominal down step size and/or at a nominal rate. If the interference level is determined by analyzer 308 to be low or minimal, adjuster 308 might increate its transmit power with a nominal up step size and/or at a nominal rate. In accordance with some aspects, if the interference level is low, adjuster 308 might determine that the power level should remain the same and no adjustments are made.

In accordance with some aspects, the step size and/or the adjustment rate can be determined based on other parameters including the current transmit power level for the terminal 304, the channel gain for the neighboring sector relative to the channel gain for the serving sector, prior OSI reports, and so forth. Adjuster 310 can modify the transmit power based on OSI reports received from one or multiple neighboring sectors.

System 300 can include a processor 312 operatively connected to terminal 304 (and/or memory 314) to execute instructions relating to receiving one or more OSI reports, analyzing information contained in the reports, determining an interference level experienced by one or more sectors. Processor 312 can also execute instructions relating to adjusting a transmit power level based on an interference level experienced by one or more sectors, determining a rate and/or a level at which to modify the transmit power, or deciding not to change the transmit power level.

Processor can further execute instructions relating to receiving a signal including a first portion corresponding to a sector-specific sequence in a first OFDM symbol and a second portion corresponding to the sector-specific sequence multiplied with a value for the signal in a second OFDM symbol, performing channel estimation using the first portion to derive a channel estimate, and using the channel estimate to compute the value included in the second portion. In accordance with some aspects, both sequences can be multiplied by a complex number, which depends on the signal value. Memory 314 can store information related to the instructions executed by processor 314 and other suitable information related to receiving information in a wireless communication network.

Processor 312 can be a processor dedicated to analyzing and/or generating information received by terminal 304 (e.g., OSI reports, interference levels, and so forth). Processor 312 can also be a processor that controls one or more components of system 300, and/or a processor that both analyzes and generates information received by transmitter 302 and controls one or more components of system 300.

Memory 316 can store protocols associated with interference level estimates, OSI reports received and a current transmit power level. Memory 316 can also store protocols relating to a channel gain for a neighboring sector relative to a channel gain for a serving sector and one or more prior OSI reports. Further, memory 316 can store protocols relating to taking action to control communication between terminal 304 and sector 302, and so forth, such that system 300 can employ stored protocols and/or algorithms to transmit information in a wireless network as described herein.

In view of the exemplary systems shown and described above, methodologies that may be implemented in accordance with the disclosed subject matter, will be better appreciated with reference to the flow charts of FIGS. 4 through 8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
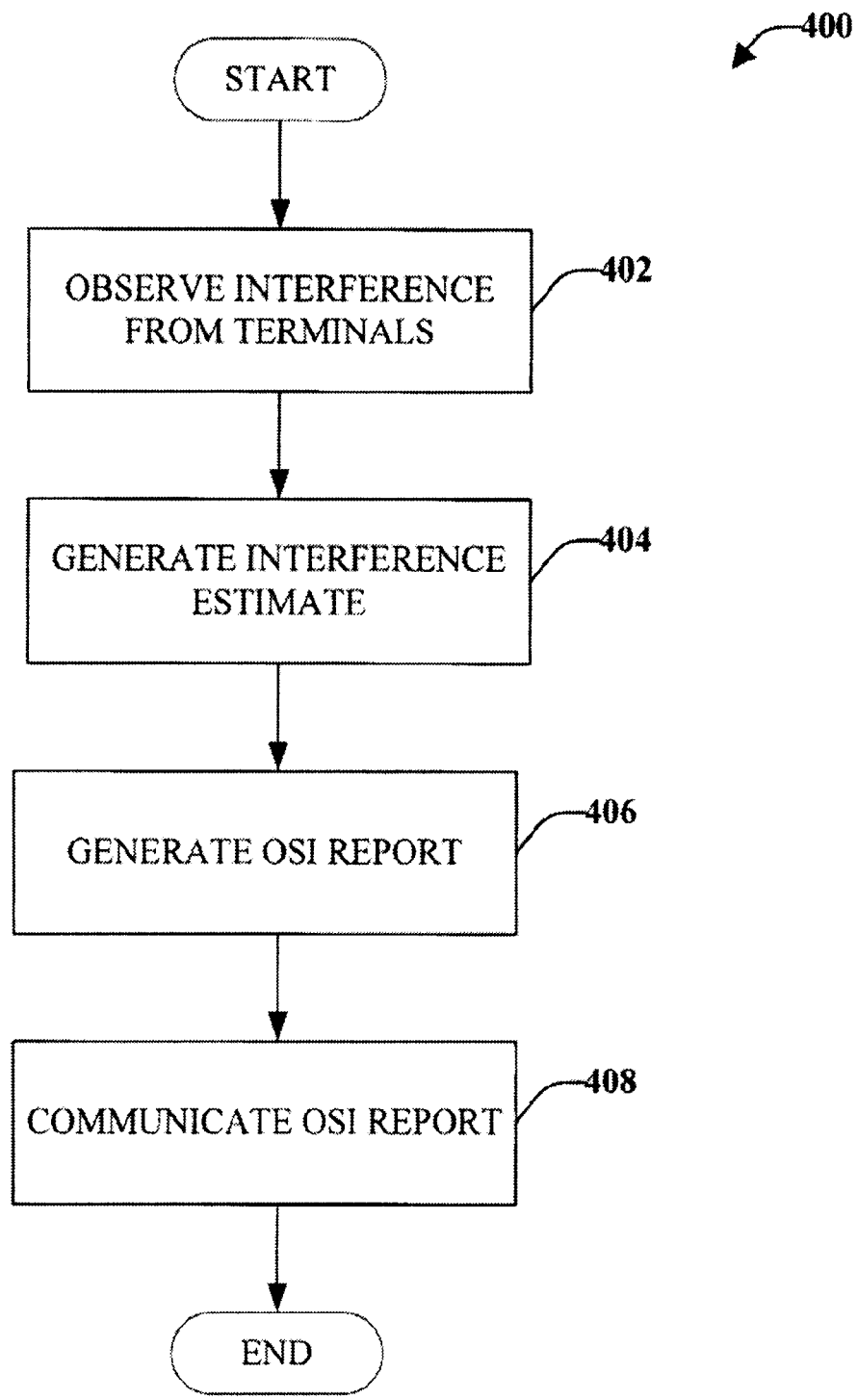
FIG. 4 illustrates a method for transmitting information relating to user-based interference control within a wireless communication network.

FIG. 4 illustrates a method 400 for transmitting information relating to user-based interference control within a wireless communication network. At 402, interference from terminals in other sectors is observed. Based in part on the observed interference, an interference estimate is generated, at 404. In accordance with some aspects, the information generated, at 404, need not be interference estimates and can constitute raw measurements and, or, thresholds obtained for the terminals of other sectors.

At 406, an Other Sector Interference (OSI) report is generated, based on the interference estimate. The OSI report conveys the amount of inter-sector interference observed and can be given in various forms, which will described in further detail below. The OSI or interference report includes an interference value that can be generated and transmitted in a signal comprising a first portion and a second portion. The first portion of the signal can correspond to a sector-specific sequence in a first OFDM symbol. The second portion of the signal can correspond to the sector-specific sequence multiplied with a value for the signal in a second OFDM symbol. In accordance with some aspects, both sequences can be multiplied by a complex number, which depends on the signal value.

The first portion of the signal can include a sector-specific random sequence multiplied by a single complex value X. The second portion of the signal can include a different sector-specific random sequence multiplied by another value Y. The value Y can be the square of the value X.

Additionally or alternatively, the first portion of the signal has a different sector-specific sequence than the second portion of the signal, and a phase multiplying the two sequences can be different. The phase can be chosen from a group consisting of 0, $2\pi/3$ and $4\pi/3$, which can constitute 3-Phase Shift Keying (3PSK) signaling and can provide the maximum distance between constellation points for a three-symbol equal-magnitude constellation. The square values form the same constellation. Thus, on a coherent channel (e.g., when a good channel estimate is available) the performance is similar to that of a repeated 3PSK constellation. However, if a channel estimate is not available, the phase difference between value Y and value X also belongs to a 3PSK constellation and, thus, this behaves as a differentially coded 3PSK system.

At 406, the OSI report is broadcast or otherwise provided to the terminals in the neighbor sectors. These terminals might adjust their transmit powers based on the OSI report, if necessary, to reduce the amount of inter-sector interference observed, at 402. In accordance with some aspects, a terminal may increase a transmit power if the interference level is minimal. Further information relating to transmitting information relating to user-based interference control within a wireless communication network are provided below.

Figure 5:
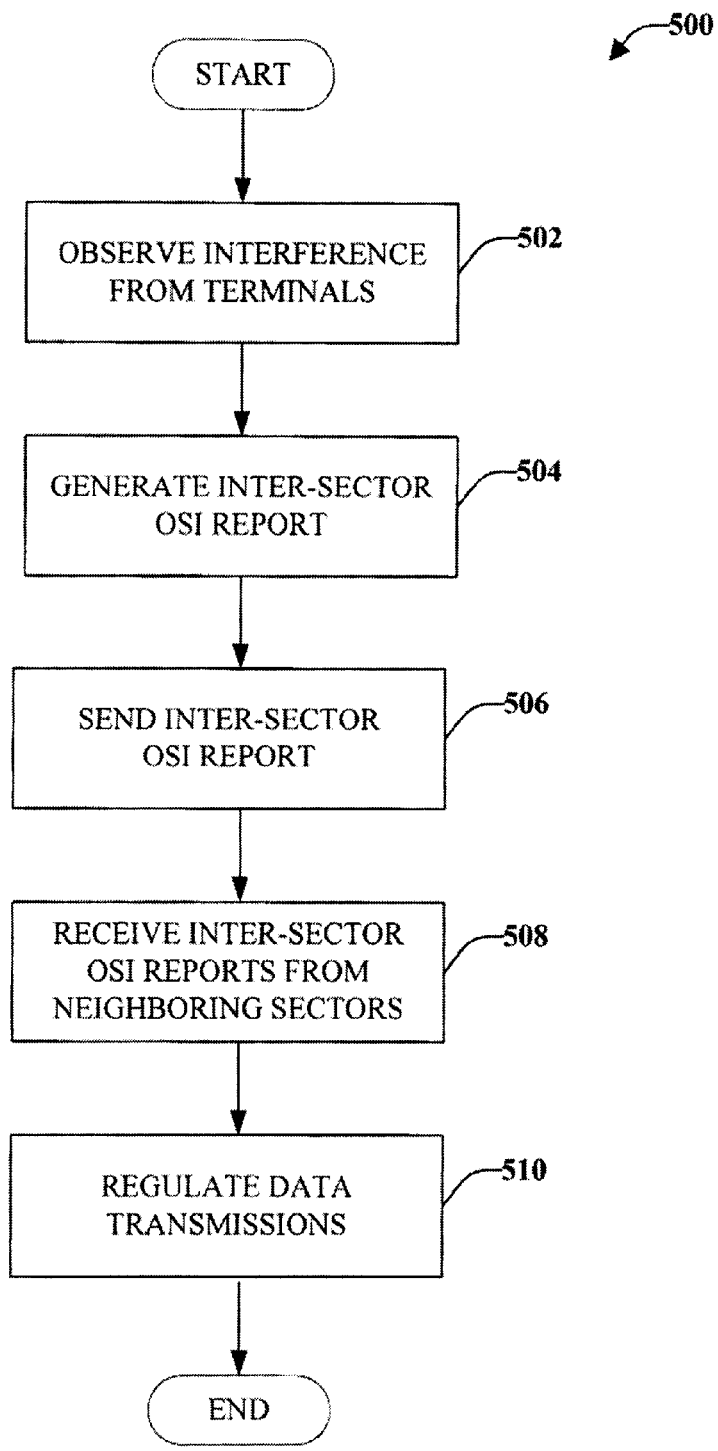
FIG. 5 illustrates a method for transmitting information relating to network-based interference control within a wireless communication network.

In accordance with a related aspect, FIG. 5 illustrates a method 500 for transmitting information relating to network-based interference control within a wireless communication network. At 502, an interference from terminals in other sectors is observed. Based on the observed interference an OSI report is generated, at 504, which can be the same OSI report discussed with reference to FIG. 4 and can include information related to interference thresholds, interference measurements, path losses, received power from terminals of a first sector measured at other sectors, and/or any other information that may be utilized to determine interference caused by terminals of a first sector and another sector from which an OSI report can be received. At 506, the OSI report is sent to neighbor sectors periodically or only if excessive interference is observed, at 504.

At 508, OSI reports from the neighboring sectors are received. The rate at which the OSI reports are exchanged among the sectors may be the same or different from the rate at which the OSI reports are broadcast to the terminals in FIG. 4. A first sector can regulates data transmissions, at 510, for terminals in the first sector based on the OSI reports received from the neighbor sectors. Further information relating to transmitting information relating to network-based interference control within a wireless communication network is provided below.

With reference to FIGS. 4 and 5, a first sector can estimate the inter-sector interference in various manners. For a communication network utilizing orthogonal multiplexing, one terminal may transmit data or pilot on each subcarrier in each symbol period. A pilot is a transmission of symbols that are known a priori by both a transmitter and a receiver. A data symbol is a modulation symbol for data, a pilot symbol is a modulation symbol for pilot, and a modulation symbol is a complex value for a point in a signal constellation (e.g., for M-PSK, M-QAM, and so on).

A first sector (e.g., sector m) may estimate the interference on a given subcarrier k in a given symbol period n based on a pilot received from a terminal u, as follows:

$$I_m(k,n)=|\hat{H}_{m,u}(k,n)\cdot(P_u(k,n)-R_{m,u}(k,n)|^2 \qquad \text{Equation (1)}$$

where $P_u(k,n)$ is a pilot symbol sent by terminal u on subcarrier k in symbol period n;

$\hat{H}_{m,u}(k,n)$ is an estimate of the channel gain between sector m and terminal u;

$R_{m,u}(k,n)$ is a received symbol obtained by sector m from terminal u; and $I_m(k,n)$ is an estimate of the interference observed by sector m.

The quantities in Equation (1) are scalars.

Sector m can also estimate the interference based on data received from terminal u, as follows:

$$I_m(k,n)=|\hat{H}_{m,u}(k,n)\cdot\hat{D}_{m,u}(k,n)-R_{m,u}(k,n)|^2 \qquad \text{Equation (2)}$$

where $\hat{D}_{m,u}(k,n)$ is an estimate of a data symbol transmitted by terminal u on subcarrier k in symbol period n. Sector m may derive data symbol estimates $\hat{D}_{m,u}(k,n)$ by performing data detection on the received symbols $R_{m,u}(k,n)$ with the channel estimate $\hat{H}_{m,u}(k,n)$ to obtain detected symbols, deriving hard-decisions based on the detected symbols, and using the hard-decisions as the data symbol estimates. Alternatively, sector m can derive the data symbol estimates by performing data detection on the received symbols, decoding the detected symbols to obtain decoded data, and re-encoding and symbol mapping the decoded data to obtain the data symbol estimates. Sector m can perform joint channel and interference estimation to obtain both channel response estimates and interference estimates.

Sector m can perform joint channel and interference estimation to obtain both channel response estimates and interference estimates. The interference estimate $I_m(k,n)$ obtained from equation (1) or equation (2) above includes both inter-sector interference and intra-sector interference. Although, this need not be the case.

A terminal typically needs to monitor the OSI from several sectors, including those sectors, which may be somewhat far away from the terminal. Therefore, there is a need for OSI Report signaling that is reliable and permits low complexity OSICH signal detection at the mobile.

In an aspect an OSI report signal (e.g., with a value of S) can be encoded over two OFDM symbols in an OFDM system. One OFDM symbol may contain a sector-specific sequence $X_1(t)$, while the other could contain the product of S and a sector-specific sequence $X_2(t)$ (e.g., $SX_2(t)$) The terminal can then perform channel estimation using the first symbol and use the derived channel estimate to compute the value of S using the second symbol.

In another aspect, the signaling could further be enhanced by signaling $SX_1(t)$ on the first OFDM symbol, and $S^2X_2(t)$ on the second OFDM symbol. If the terminal has no channel information corresponding to the sector of interest, it could use the algorithm described in the previous paragraph since the signals in the two symbols still differ by the phase value S. However, if a channel estimate is available from some other source, an enhanced detection algorithm that jointly detects the two symbols may be used.

It should be noted that the encoding scheme described above may be used for other control channels or overhead channels from a sector, and may be used from channels from other devices.

In an aspect, the OSI may be transmitted on OFDM Symbols 5 and 6 of a superframe preamble comprising at least 6 OFDM symbols. The superframe preamble may carry one of three OSIValues {0, 1, 2}, where each value may also correspond to a phase for the second OFDM symbol (e.g., 0, π/2, and π respectively).

In those aspects, where the OSI report may include the OFDM symbols with index 5 and 6 in each superframe preamble and OSI report carriers a three-state quantity OSIValue (e.g., taking the value 0, 1, or 2). The OFDM symbol 5 may be constructed according to the method of FIG. 6.

Figure 6:
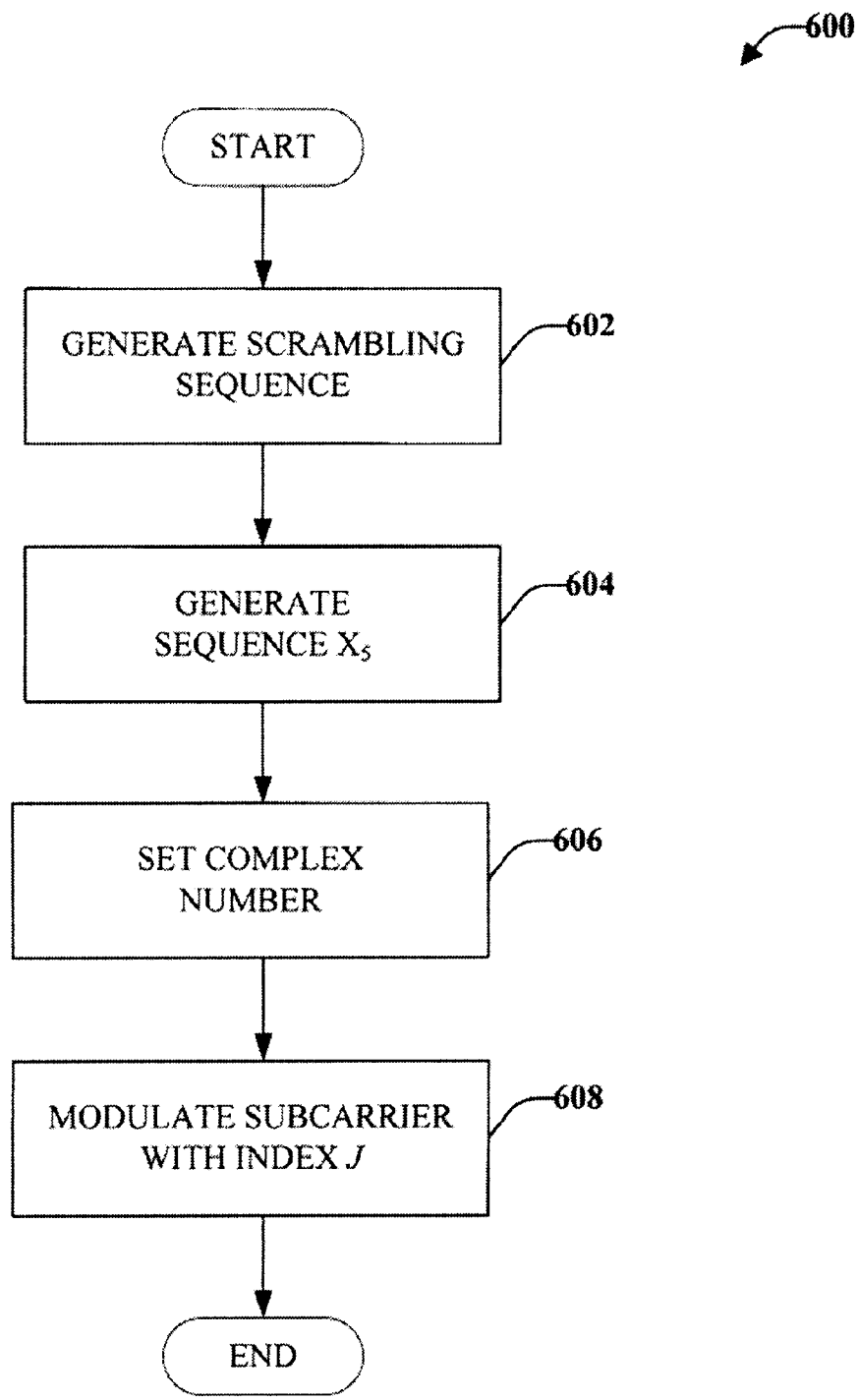
FIG. 6 illustrates a method for constructing OFDM symbol 5 in accordance with an aspect.

FIG. 6 illustrates a method 600 for constructing OFDM symbol 5 in accordance with an aspect. At 602, a scrambling sequence $F_{OSICH-5}$ of length 512 is generated using a common BPSK scrambling algorithm with input seed [0000 0001 1001 1000 0000] or some other predetermined input seed value. A sequence $X_5$ of length 512 is generated, at 604, where $X_5(k)=F_{OSICH-5}(k)*W_P^{512}(k)$ where P is the PreamblePN and $W_P^{512}$ is the Walsh sequence with index P and length 512. Let $Y_5$ be the DFT of the $X_5$.

At 606, a complex number $S_{OSICH}$ is set. If the OSIValue is 0, the complex number $S_{OSICH}$ is set to (1,0). If the OSIValue is 1, the complex number $S_{OSICH}$ is set to (0,1). If the OSIValue is 2, the complex number $S_{OSICH}$ is set to (-1,0). At 608, the subcarrier with index j within the ChosenPreambleSubcarrierSet in OFDM Symbol i is modulated with the value $\sqrt{P_{OSICH}}S_{OSICH}Y_5(j)$, provided it is a usable subcarrier. The exact value of $P_{OSICH}$ used is beyond the scope of this specification.

Figure 7:
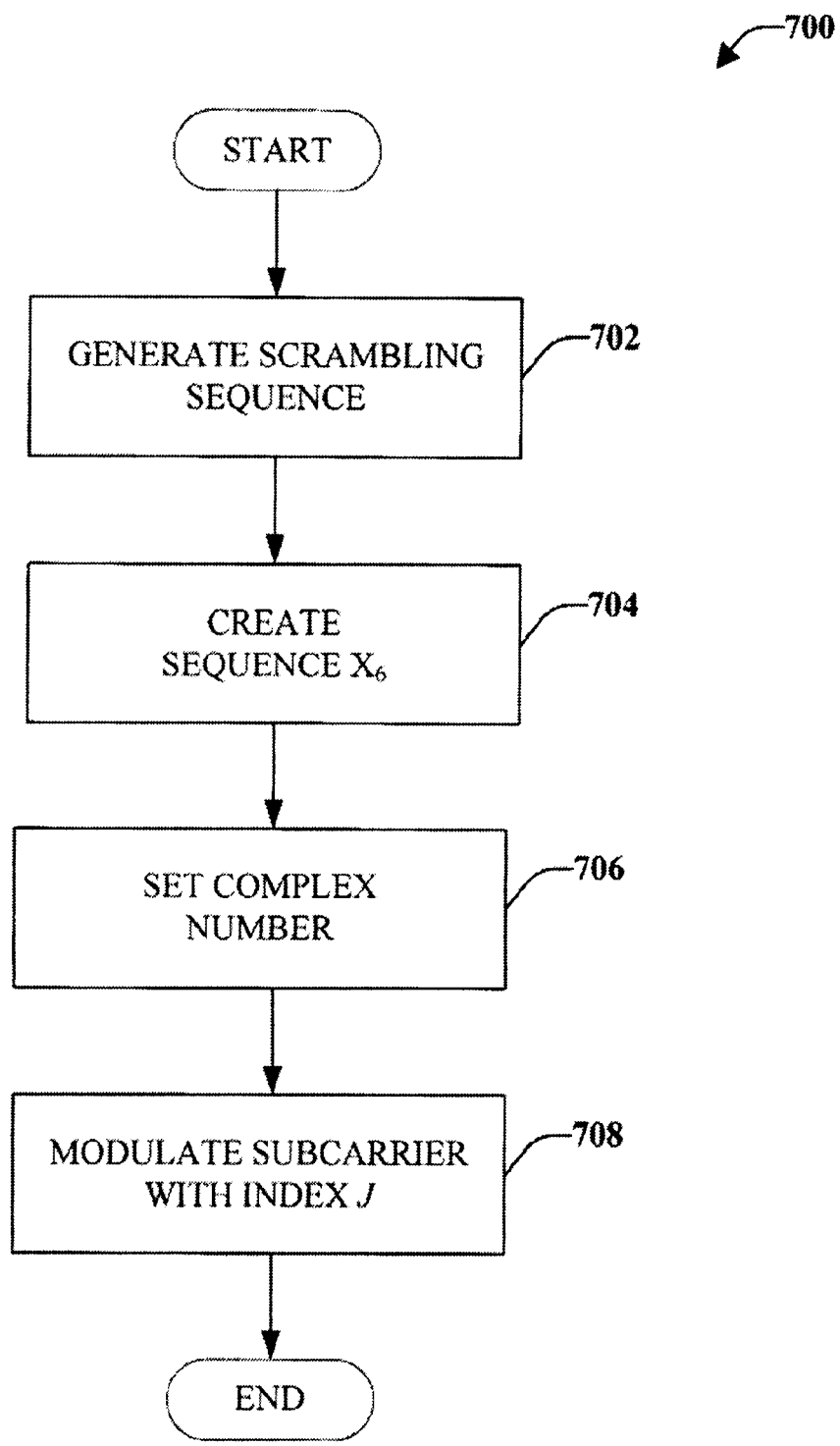
FIG. 7 illustrates a method for constructing OFDM symbol 6 in accordance with an aspect.

FIG. 7 illustrates a method 700 for constructing OFDM symbol 6 in accordance with an aspect. At 702, a scrambling sequence $F_{OSICH}$-6 of length 512 is generated using a common BPSK scrambling algorithm with input seed [0001 0011 1000 0111 1000] or some other predetermined input seed value. At 704, a sequence $X_6$ of length 512 is created, where $X_6(k)=F_{OSICH-6}(k)*W_{TMP}^{512}(k)$. Here TMP is equal to the PreamblePN in SemiSynchronous mode and equal to the 9 bits of the superframe index in Asynchronous mode. $W_{TMP}^{512}$ is the Walsh sequence with index TMP and length 512. Let Y6 be the DFT of the $X_6$.

At 706, a complex number $S_{OSICH}$ is set. If the OSI value is 0, the complex number $S_{OSICH}$ is set to (1,0). If the OSI value is 1, the complex number $S_{OSICH}$ is set to (0,1). If the OSI value is 2, the complex number $S_{OSICH}$ is set to (-1,0). The subcarrier with index j within the ChosenPreambleSubcarrierSet in OFDM Symbol i is modulated, at 708, with the value $\sqrt{P_{OSICH}}S_{OSCH}^2Y_6(j)$, provided it is a usable subcarrier. The value of $P_{OSICH}$ is the same as that used in the generation of OFDM symbol 5 discussed with reference to FIG. 6.

Figure 8:
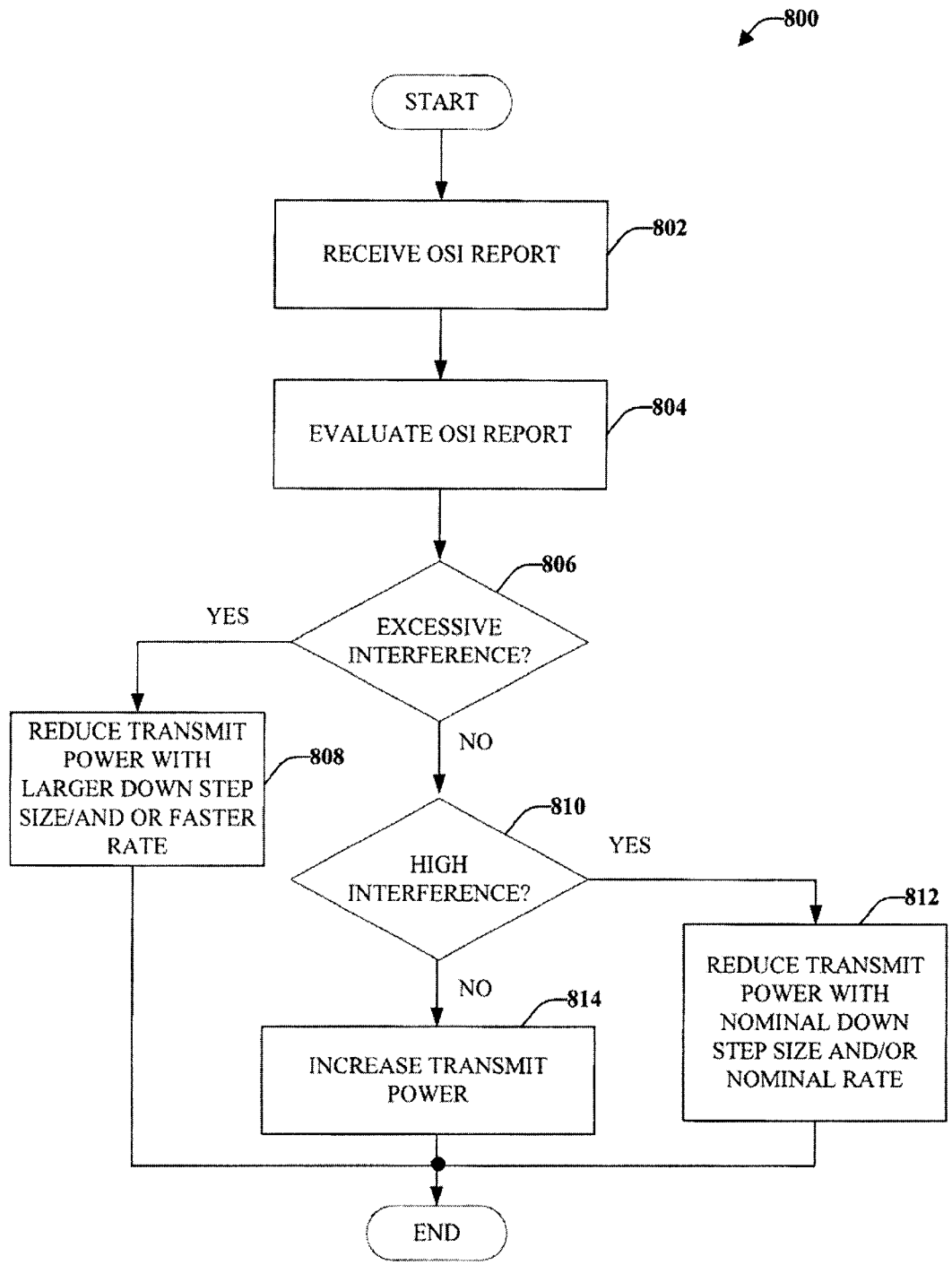
FIG. 8 illustrates a method for interference control in a wireless communication network.

With reference now to FIG. 8, illustrated is a method 800 for interference control in a wireless communication network. Method can be utilized by one or more terminals. At 802, an OSI report is received from a neighboring sector. This report can be utilized to convey the value of intersector interference (e.g., interference caused by receivers in neighboring sectors). The OSI report can be received in a signal that includes two portions.

The interference information contained in the OSI report is analyzed at 804 and a determination is made, at 806, where the neighbor sector observes excessive interference. If there is excessive interference observed ("YES"), method 800 continues, at 810, and the terminal reduces its transmit power with a larger down step size and/or at a faster rate.

If the determination at 806 is that the neighboring sector is not observing excessive interference, method 800 continues, at 810, with a determination whether the neighbor sector observes high interference. If it is determined that the neighboring sector observes high interference ("YES"), at 812, the terminal reduces its transmit power with a nominal down step size and/or at a nominal rate. If the determination, at 810, is that the neighboring sector is not experiencing high interference ("NO"), it can indicate that the interference level observed by neighboring sector is below a threshold level. At 814, terminal can increase its transmit power with a nominal up step size and/or at a nominal rate. In accordance with some aspects, at 814 the transmit power is not increased but remains the same.

FIG. 8 illustrates an embodiment in which the OSI report conveys the inter-sector interference observed by the neighbor sector in one of three possible levels (low, high, and excessive). Method 800 can be extended to cover any number of interference levels. In general, the transmit power for terminal may be (1) reduced by a down step that is related to the amount of interference observed by the neighbor sector (e.g., larger down step for higher interference) when the measured interference is above a given threshold and/or (2) increased by an up step that is inversely related to the amount of interference observed by the neighbor sector (e.g., larger up step for lower interference) when the measured interference is below the given threshold. The step size and/or the adjustment rate may also be determined based on other parameters such as, for example, the current transmit power level for the terminal, the channel gain for the neighbor sector relative to the channel gain for the serving sector, prior OSI reports, and so on. Terminal may adjust its transmit power based on the OSI report from one or multiple neighbor sectors.

Figure 9:
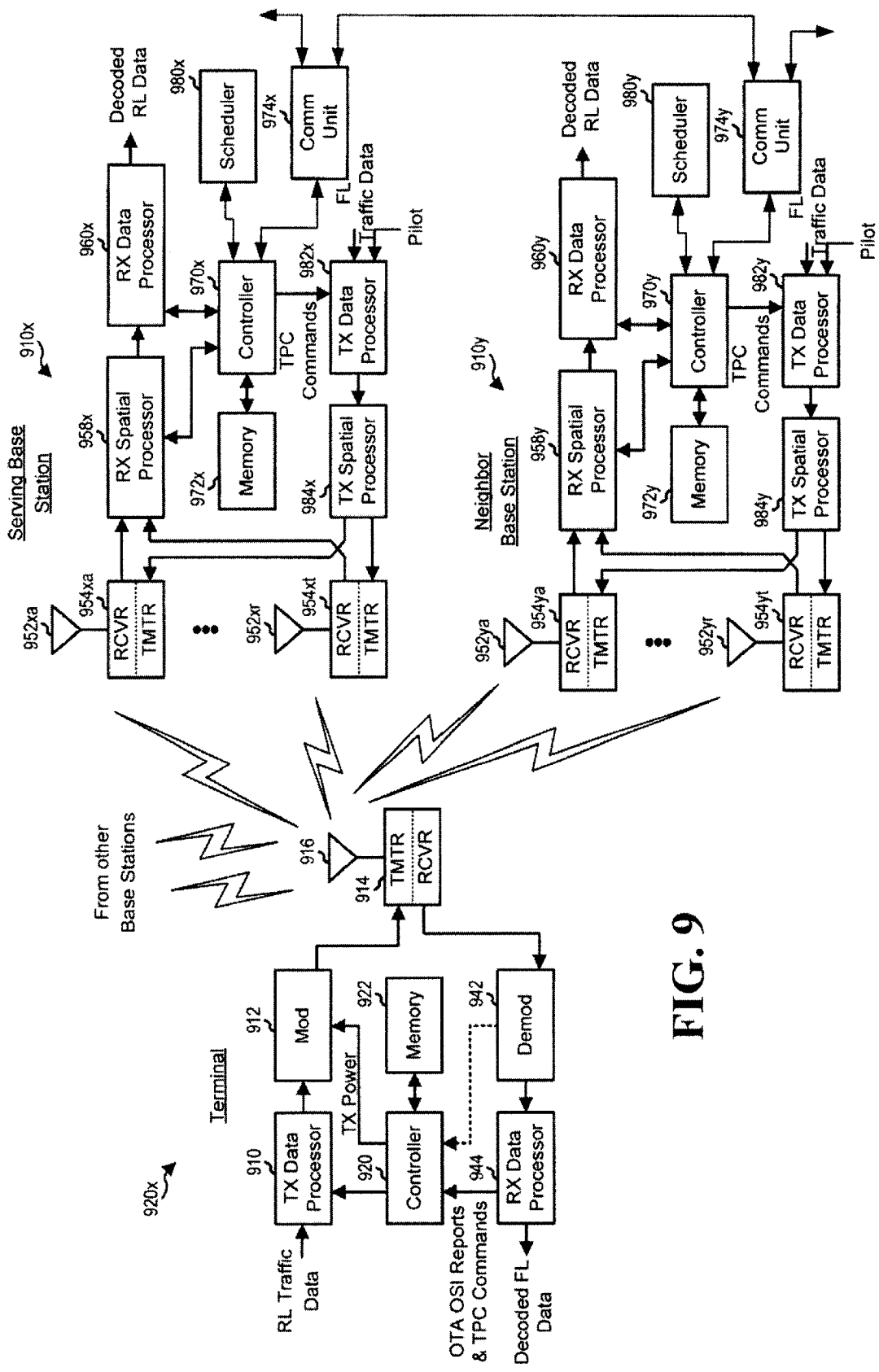
FIG. 9 illustrates a block diagram of a terminal and two base stations.

FIG. 9 illustrates a block diagram of an embodiment of terminal 920x, serving base station 910x, and neighbor base station 910y. On the reverse link, at terminal 920x, a TX data processor 910 encodes, interleaves, and symbol maps reverse link (RL) traffic data and control data and provides data symbols. A modulator (Mod) 912 maps the data symbols and pilot symbols onto the proper subbands and symbol periods, performs OFDM modulation if applicable, and provides a sequence of complex-valued chips. A transmitter unit (TMTR) 914 conditions (e.g., converts to analog, amplifies, filters, and frequency upconverts) the sequence of chips and generates a reverse link signal, which is transmitted via an antenna 916.

At serving base station 910x, multiple antennas 952xa through 952xt receive the reverse link signals from terminal 920x and other terminals. Each antenna 952x provides a received signal to a respective receiver unit (RCVR) 954x. Each receiver unit 954x conditions (e.g., filters, amplifies, frequency downconverts, and digitizes) its received signal, performs OFDM demodulation if applicable, and provides received symbols. An RX spatial processor 958 performs receiver spatial processing on the received symbols from all receiver units and provides data symbol estimates, which are its are estimates of the transmitted data symbols. An RX data processor 960x demaps, deinterleaves, and decodes the data symbol estimates and provides decoded data for terminal 920x and other terminals currently served by base station 910x.

The processing for a forward link transmission may be performed similarly to that described above for the reverse link. The processing for the transmissions on the forward and reverse links is typically specified by the system.

For interference and power control, at serving base station 910x, RX spatial processor 958x estimates the received SNR for terminal 920x, estimates the inter-sector interference observed by base station 910x, and provides an SNR estimate for terminal 910x and an interference estimate (e.g., the measured interference $I_{meas,m}$) to a controller 970x. Controller 970x may generate an OSI report. Controller 970x may also receive OSI reports from neighbor sectors via a communication (Comm) unit 974x. The OSI report for base station 910x, and possibly OSI reports for other sectors are processed by a TX data processor 982x and a TX spatial processor 984x, conditioned by transmitter units 954xa through 954xt, and transmitted via antennas 952xa through 952xt. The OSI report from base station 910x may be sent to the neighbor sectors via communication unit 974x, e.g. via a backhaul or other wired communication link.

At neighbor base station 910y, an RX spatial processor 958y estimates the inter-sector interference observed by base station 910y and provides an interference estimate to controller 970y. Controller 970y may generate an OSI report. The OSI report is processed and broadcast to the terminals in the system. The OSI report may be sent to the neighbor sectors via a communication unit 974y.

At terminal 920x, antenna 916 receives the forward link signals from the serving and neighbor base stations and provides a received signal to a receiver unit 914. The received signal is conditioned and digitized by receiver unit 914 and further processed by a demodulator (Demod) 942 and an RX data processor 944. Processor 944 provides the OSI reports broadcast by the neighbor base stations. A channel estimator within demodulator 942 estimates the channel gain for each base station. Controller 920 also adjusts the transmit power for the traffic channel based on the OSI reports received from the neighbor base stations and the channel gains for the serving and neighbor base stationsController 920 provides the transmit power for the traffic channel assigned to terminal 920x. Processor 910 and/or modulator 912 scales the data symbols based on the transmit power provided by controller 920.

Controllers 920, 970x, and 970y direct the operations of various processing units at terminal 920x and base station 910x and 910y, respectively. These controllers may also perform various functions for interference and power control. A scheduler 980x schedules terminals for communication with base station 910x and also assigns traffic channels to the scheduled terminals (e.g., based on the OSI reports from the neighbor base stations).

Figure 10:
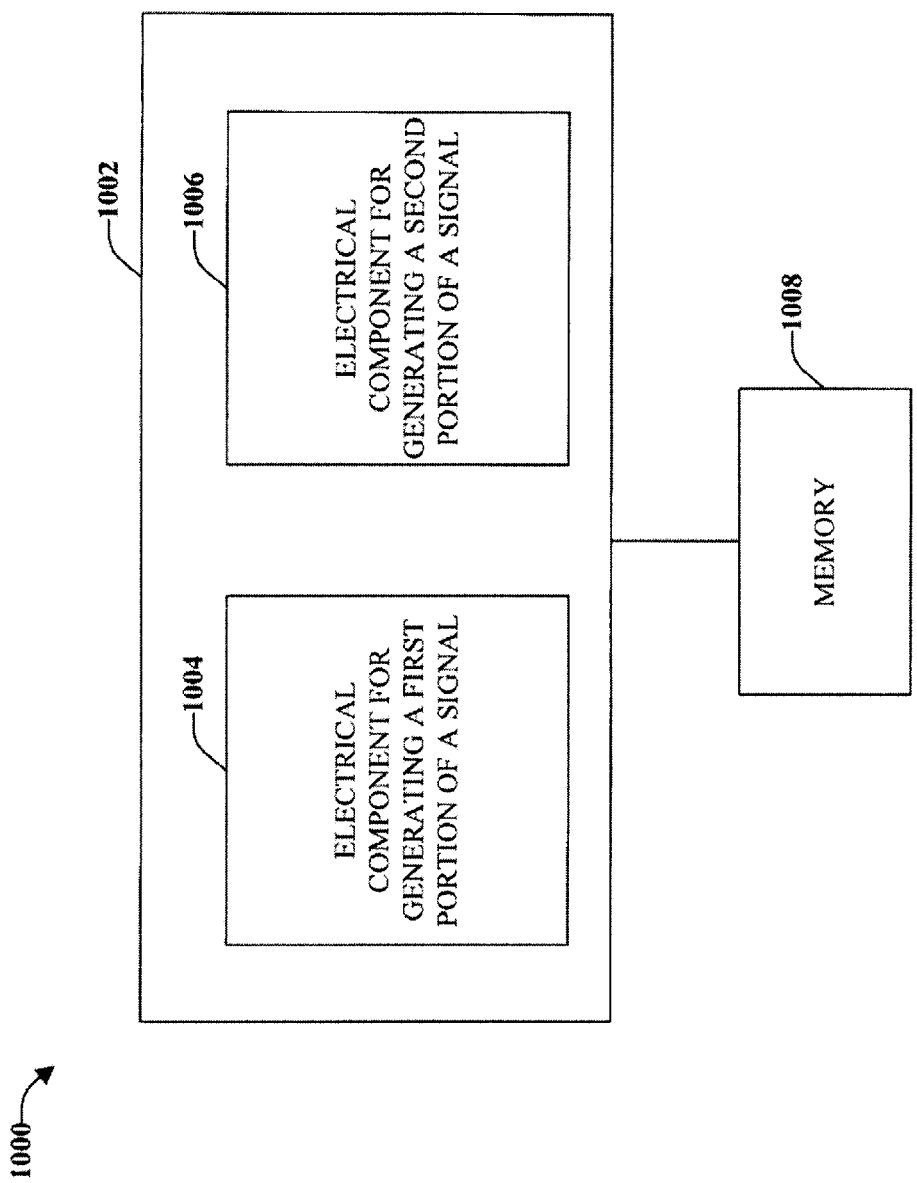
FIG. 10 illustrates an example system for providing interference information.

With reference to FIG. 10, illustrated is an example system 1000 for providing interference information. For example, system 1000 may reside at least partially within a base station. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. For instance, logical grouping 1002 may include an electrical component for generating a first portion of a signal corresponding to a sector-specific sequence in a first OFDM symbol 1004. Further, logical grouping 1002 can comprise an electrical component for generating a second portion of the signal corresponding to the sector-specific sequence multiplied with a value for the signal in a second OFDM symbol 1006. In accordance with some aspects, both sequences can be multiplied by a complex number that depends on the signal value.

The signal can include an interference report and the value comprises an interference value. In accordance with some aspects, the first sector-specific sequence can include a sector-specific random sequence multiplied by a single complex value X and the second sequence can include a different sector-specific random sequence multiplied by another value Y. The value Y can be the square of value X.

In accordance with other aspects, a different sector-specific sequence is for the first portion and the second portion, The phases multiplying the two sequences can be different. The phase can be chosen from a group consisting of 0, 2π/3 and 4π/3.

Additionally, system 1000 can include a memory 1008 that retains instructions for executing functions associated with electrical components 1004 and 1006 or other components. While shown as being external to memory 1008, it is to be understood that one or more of electrical components 1004 and 1006 may exist within memory 1008.

Figure 11:
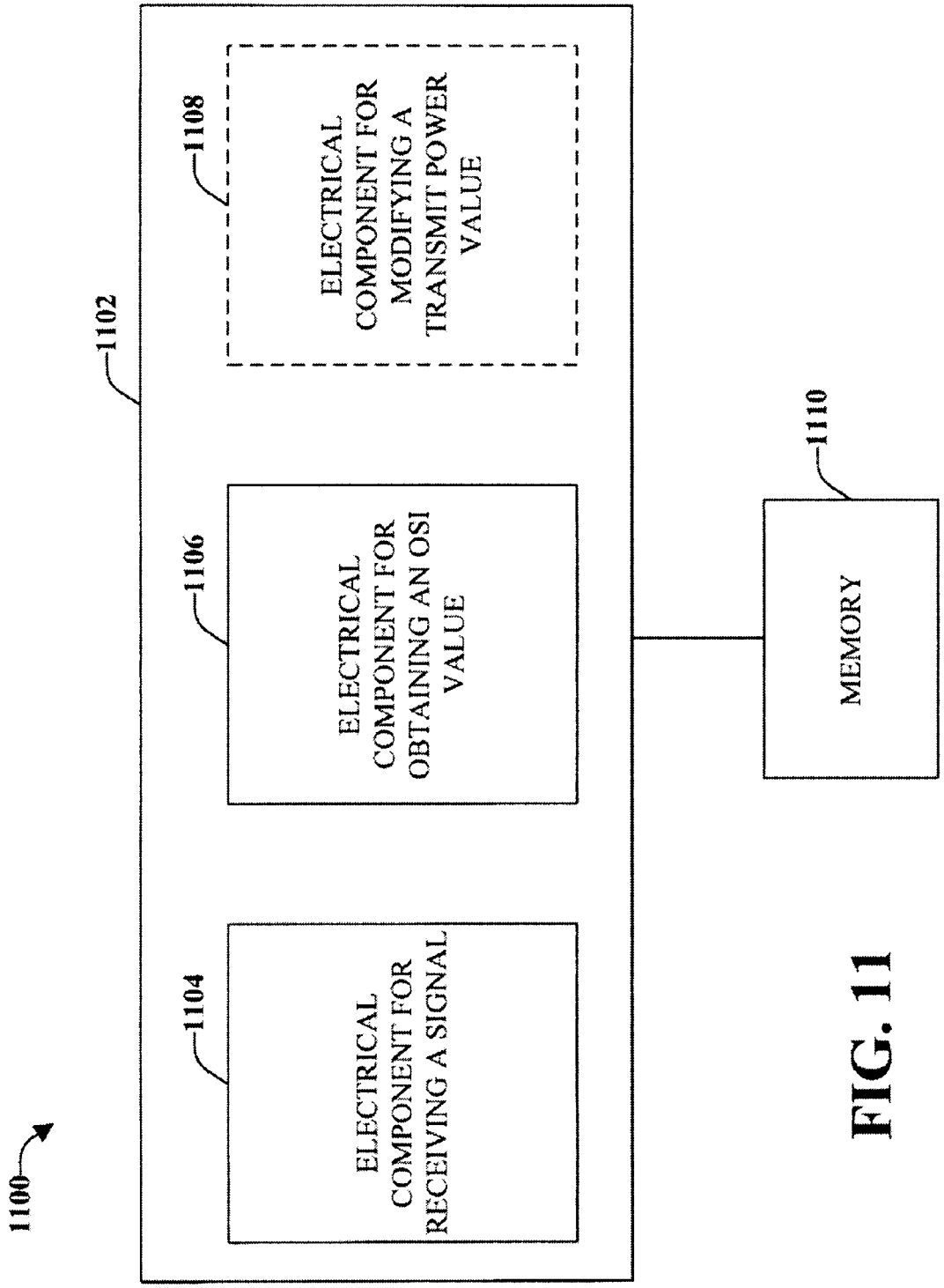
FIG. 11 illustrate an example system for processing interference information.

With reference to FIG. 11, illustrated is an example system 1100 for processing interference information. For example, system 1100 may reside at least partially within a terminal. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. For instance, logical grouping 1102 may include an electrical component for receiving a signal 1104. The signal can include a first portion and a second portion. The first portion can correspond to a sector-specific sequence in a first OFDM symbol and a second portion corresponding to the sector-specific sequence multiplied with a value for the signal in a second OFDM symbol. In accordance with some aspects, both sequences are multiplied by a complex number that depends on the signal value.

Further, logical grouping 1102 can comprise an electrical component for utilizing the first and second portions to determine an OSI level. The signal can include an interference report and the value comprises an interference value. Additionally or alternatively, logical grouping 1102 can include an electrical component for modifying a transmit power level based on the OSI value. The OSI value indicates one of an excessive interference, a high interference, or a minimal interference.

Logical grouping 1102 can comprise an electrical component for performing channel estimation using the first portion to derive a channel estimate. Also included can be an electrical component for computing a value included in the signal. The value can be derived by using the channel estimate to compute the value included in the second portion.

In accordance with some aspects, the first sector-specific sequence can include a sector-specific random sequence multiplied by a single complex value X and the second sequence can include a different sector-specific random sequence multiplied by another value Y, where value Y is the square of value X. In accordance with other aspects, a different sector-specific sequence is for the first portion and the second portion. The phases multiplying the two sequences can be different. The phase can be chosen from a group consisting of 0, 2π/3 and 4π/3

Additionally, system 1100 can include a memory 1110 that retains instructions for executing functions associated with electrical components 1104, 1106 and 1108 or other components. While shown as being external to memory 1110, it is to be understood that one or more of electrical components 1104, 1106 and 1108 may exist within memory 1110.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

The invention claimed is:

1. A method for transmitting information in a wireless communication system, comprising:
  transmitting, by a wireless communication apparatus, a first portion of a signal comprising a first sector-specific sequence in a first OFDM symbol; and
  transmitting, by the wireless communication apparatus, a second portion of the signal comprising a second sector-specific sequence multiplied with a complex number that corresponds to an interference value in a second OFDM symbol.

2. The method of claim 1, wherein the signal comprises an interference report.

3. The method of claim 1, wherein both sequences are multiplied by a complex number that corresponds to an interference value.

4. The method of claim 1, wherein the first portion comprises a sector-specific random sequence multiplied by a single complex value X and the second portion comprises a different sector-specific random sequence multiplied by another value Y, where Y is the square of X.

5. The method of claim 1, wherein the first portion has a different sector-specific sequence than the second portion, and phases multiplying the two sequences are different.

6. The method of claim 5, wherein the phases are chosen from a group including 0, $2\pi/3$ and $4\pi/3$.

7. A wireless communications apparatus, comprising:
   a processor that executes instructions for transmitting a first portion of a signal comprising a first sector-specific sequence in a first OFDM symbol and a second portion of the signal comprising a second sector-specific sequence multiplied with a complex number that corresponds to an interference value in a second OFDM symbol; and
   a memory that stores information relating to the instructions generated by the processor.

8. The wireless communications apparatus of claim 7 wherein the signal comprises an interference report.

9. The wireless communications apparatus of claim 7, wherein both sequences are multiplied by a complex number that corresponds to an interference value.

10. The wireless communications apparatus of claim 7, wherein the first portion comprises a sector-specific random sequence multiplied by a single complex value X and the second portion comprises a different sector-specific random sequence multiplied by another value Y, where Y is the square of X.

11. The wireless communications apparatus of claim 7, wherein the first portion has a different sector-specific sequence than the second portion, and phases multiplying the two sequences are different.

12. The wireless communications apparatus of claim 11, wherein the phases are chosen from a group including 0, $2\pi/3$ and $4\pi/3$.

13. A wireless communications apparatus that provides interference information, comprising:
   means for transmitting a first portion of a signal comprising a first sector-specific sequence in a first OFDM symbol; and
   means for transmitting a second portion of the signal comprising a second sector-specific sequence multiplied with a complex number that corresponds to an interference value in a second OFDM symbol.

14. The wireless communications apparatus of claim 13, wherein the signal comprises an interference report.

15. The wireless communications apparatus of claim 13, wherein both sequences are multiplied by a complex number that corresponds to an interference value.

16. The wireless communications apparatus of claim 13, wherein the first portion comprises a sector-specific random sequence multiplied by a single complex value X and the second portion comprises a different sector-specific random sequence multiplied by another value Y, where value Y is the square of value X.

17. The wireless communications apparatus of claim 13, wherein the first portion has a different sector-specific sequence than the second portion, and phases multiplying the two sequences are different.

18. The wireless communications apparatus of claim 17, wherein the phases are chosen from a group including 0, $2\pi/3$ and $4\pi/3$.

19. A non-transitory computer-readable medium as an article of manufacture having stored thereon instructions that are executable by a processor for:
   transmitting a first portion of a signal comprising a first sector-specific sequence in a first OFDM symbol; and
   transmitting a second portion of the signal comprising a second sector-specific sequence multiplied with a complex number that corresponds to an interference value in a second OFDM symbol, wherein the signal comprises an interference report.

20. The computer-readable medium of claim 19, wherein the first portion has a different sector-specific sequence than the second portion, and a phase multiplying the two sequences is different, the phase is chosen from a group including 0, $2\pi/3$ and $4\pi/3$.

21. The computer-readable medium of claim 19, wherein the first portion comprises a sector-specific random sequence multiplied by a single complex value X and the second portion comprises a different sector-specific random sequence multiplied by another value Y, where Y is the square of X.

22. An apparatus operable in a wireless communication system, the apparatus comprising:
   a processor configured to
      transmit a first portion of a signal comprising a first sector-specific sequence in a first OFDM symbol; and
      transmit a second portion of the signal comprising a second sector-specific sequence multiplied with a complex number that corresponds to an interference value for the signal in a second OFDM symbol.

23. A method for processing information in a wireless communication system, comprising:
   receiving, by a wireless communication apparatus, a signal that includes a first portion and a second portion, wherein the first portion of the signal comprises a first sector-specific sequence and the second portion of the signal comprises a second sector-specific sequence multiplied with a complex number that corresponds to an Other Sector Interference (OSI) value; and
   using, by the wireless communication apparatus, the first portion and the second portion to obtain the OSI value.

24. The method of claim 23, further comprising modifying a transmit power level based on the OSI value.

25. The method of claim 23, wherein the OSI value indicates one of an excessive interference, a high interference, or a minimal interference.

26. The method of claim 23, wherein the first portion corresponds to a first OFDM symbol and the second portion corresponds to a second OFDM symbol.

27. The method of claim 26, further comprising:
   performing channel estimation using the first portion to derive a channel estimate; and
   using the channel estimate to compute the OSI value included in the second portion.

28. The method of claim 23, wherein the signal comprises an interference report.

29. A wireless communications apparatus, comprising:
   a processor that executes instructions for receiving a signal that includes a first portion and a second portion and using the first portion and the second portion to obtain an Other Sector Interference (OSI) value, wherein the first portion of the signal comprises a first sector-specific sequence and the second portion of the signal comprises a second sector-specific sequence multiplied with a complex number that corresponds to the OSI value; and
   a memory that stores information relating to the instructions generated by the processor.

30. The wireless communications apparatus of claim 29, wherein the processor further executes instructions for modifying a transmit power level based on the OSI value.

31. The wireless communications apparatus of claim 29, wherein the OSI value indicates one of an excessive interference, a high interference, or a minimal interference.

32. The wireless communications apparatus of claim 29, wherein the first portion corresponds to a first OFDM symbol and the second portion corresponds to a second OFDM symbol.

33. The wireless communications apparatus of claim 32, wherein the processor further executes instructions for performing channel estimation using the first portion to derive a channel estimate and uses the channel estimate to compute the value included in the second portion.

34. The wireless communications apparatus of claim 29, wherein the signal comprises an interference report.

35. A wireless communications apparatus that processes information, comprising:
   means for receiving a signal that includes a first portion and a second portion, wherein the first portion of the signal comprises a first sector-specific sequence and the second portion of the signal comprises a second sector-specific sequence multiplied with a complex number that corresponds to an Other Sector Interference (OSI) value; and
   means for using the first portion and the second portion to obtain the OSI value.

36. The wireless communications apparatus of claim 35, further comprising a means for modifying a transmit power level based on the OSI value.

37. The wireless communications apparatus of claim 35, wherein the OSI value indicates one of an excessive interference, a high interference, or a minimal interference.

38. The wireless communications apparatus of claim 35 wherein the first portion corresponds to a first OFDM symbol and the second portion corresponds to a second OFDM symbol.

39. The wireless communications apparatus of claim 38, further comprising:
   means for performing channel estimation using the first portion to derive a channel estimate; and
   means for using the channel estimate to compute the OSI value.

40. The wireless communications apparatus of claim 35, wherein the signal comprises an interference report.

41. A non-transitory computer-readable medium as an article of manufacture having stored thereon instructions that are executable by a processor for:
   receiving a signal that includes a first portion and a second portion, wherein the first portion of the signal comprises a first sector-specific sequence and the second portion of the signal comprises a second sector-specific sequence multiplied with a complex number that corresponds to an Other Sector Interference (OSI) value;
   using the first portion and the second portion to obtain the OSI value that indicates one of an excessive interference, a high interference, or a minimal interference; and
   modifying a transmit power level based on the OSI value.

42. An apparatus operable in a wireless communication system, the apparatus comprising:
   a processor configured to:
      receive a signal that includes a first portion and a second portion, wherein the first portion of the signal comprises a first sector-specific sequence and the second portion of the signal comprises a second sector-specific sequence multiplied with a complex number that corresponds to an Other Sector Interference (OSI) value;
      utilize the first portion and the second portion to obtain the OSI value that indicates one of an excessive interference, a high interference, or a minimal interference; and
      modify a transmit power level based on the OSI value.

* * * * *